United States Patent
Seo et al.

(10) Patent No.: US 7,760,797 B2
(45) Date of Patent: Jul. 20, 2010

(54) METHOD OF REDUCING A NUMBER OF COMPUTATIONS IN AN EQUALIZATION PROCESS AND APPARATUS FOR PERFORMING THE SAME

(75) Inventors: Dong-Wook Seo, Suwon-si (KR); Gi-Bong Jeong, Seoul (KR); Il-Yong Jong, Incheon (KR); Hee-Su Kim, Seongnam-si (KR)

(73) Assignee: Samsung Electronics Co, Ltd., Suwon-si, Gyeonggi-do (KR)

( * ) Notice: Subject to any disclaimer, the term of this patent is extended or adjusted under 35 U.S.C. 154(b) by 724 days.

(21) Appl. No.: 11/671,522

(22) Filed: Feb. 6, 2007

(65) Prior Publication Data

US 2007/0258515 A1 Nov. 8, 2007

(30) Foreign Application Priority Data

Feb. 6, 2006 (KR) .................... 10-2006-0010975

(51) Int. Cl.
*H03K 5/159* (2006.01)
(52) U.S. Cl. .................................... 375/232
(58) Field of Classification Search ............ 375/229, 375/230, 232, 233
See application file for complete search history.

(56) References Cited

U.S. PATENT DOCUMENTS

| 5,465,316 | A * | 11/1995 | Tanaka ................. 704/219 |
| 6,775,322 | B1 | 8/2004 | Zangi et al. |
| 2003/0048838 | A1 | 3/2003 | Sexton et al. |
| 2005/0018794 | A1 | 1/2005 | Tang et al. |

FOREIGN PATENT DOCUMENTS

| GB | 2 247 812 | 3/1992 |
| JP | 2001-237796 | 8/2001 |
| WO | WO 02/15505 | 2/2002 |

OTHER PUBLICATIONS

English Abstract for Publication No. 2001-237796.
European Search Report, dated Feb. 25, 2008.

* cited by examiner

*Primary Examiner*—David B Lugo
(74) *Attorney, Agent, or Firm*—F. Chau & Associates, LLC

(57) ABSTRACT

A method of reducing a number of computations in an equalization process includes performing a pre-equalization operation on selected first frames from a plurality of frames, and estimating pre-equalization values of second frames based on the pre-equalization values of selected first frames, the second frames being frames which are not selected from the plurality of frames.

22 Claims, 7 Drawing Sheets

METHOD OF REDUCING A NUMBER OF COMPUTATIONS IN AN EQUALIZATION PROCESS AND APPARATUS FOR PERFORMING THE SAME

CROSS-REFERENCE TO RELATED APPLICATIONS

This application claims priority under 35 U.S.C. §119 to Korean Patent Application No. 2006-10975 filed on Feb. 6, 2006 in the Korean Intellectual Property Office (KIPO), the entire contents of which are herein incorporated by reference.

BACKGROUND OF THE INVENTION

1. Field of the Invention

The present invention relates to an equalization process, and more particularly to a method of reducing a number of computations in an equalization process and an apparatus for performing the same.

2. Description of Related Art

Increasing consumer demand for mobile services is a driving force in developing mobile communication systems, such as the Global System for Mobile Communications (GSM).

Enhanced Data rates for GSM Evolution (EDGE), a faster version of the GSM wireless service, is designed to deliver data at rates up to 384 Kbps and enable the delivery of multimedia and other broadband applications to mobile phones and computer users. The EDGE standard is built on the existing GSM standard, using the same time division multiple access (TDMA) frame structure and existing cell arrangements.

To achieve higher data rates, the EDGE standard employs a new modulation scheme, known as 8-phase shift keying (8-PSK). Another modulation scheme, Gaussian minimum shift keying (GMSK) may also be used in situations where a more robust modulation is needed.

The GMSK modulation uses a signal space with the signal points +1 and −1, thereby enabling each pulse to carry 1 bit of information. The 8-PSK modulation uses a signal space with eight signal points, the phase difference between the individual signal points being 45 degrees, thereby enabling each pulse to carry 3 bits of information. As the amount of information carried by each pulse is higher, the 8-PSK modulation becomes more vulnerable to errors caused by intersymbol interference (ISI).

The ISI is the residual effect of other neighboring symbols when decoding a certain symbol, and this residual effect is due to the occurrence of pulses before and after the sampling instant.

The presence of the ISI in a mobile communication system, such as a system based on the EDGE standard, introduces errors in a receiver. Therefore, a filter design of an EDGE receiver and transmitter seeks to diminish the effects of the ISI and thereby deliver data to the destination with the smallest error rate possible.

FIG. 1 is a block diagram illustrating an equalization system for reducing ISI.

Referring to FIG. 1, the equalization system 100 includes a channel estimator 110, a prefilter 120 and a delayed decision feedback sequence estimator (DDFSE) 130.

The channel estimator 110 is needed in a system employing a coherent modulation and demodulation scheme, and in the EDGE standard, and receives a training sequence included in a burst to output an estimated channel model.

The prefilter 120 matches a channel so as to increase a signal-to-noise at) ratio (SNR) at a decision time when a certain symbol is determined. Typically, the prefilter 120 receives, from the channel estimator 110, coefficients for a prefiltering operation to transmit, to the DDFSE 130, complex symbol spaced samples.

The DDFSE 130 reduces the ISI of an input signal to output an estimated signal, and receives parameters from the channel estimator 110 and the prefilter 120 to output an ISI-reduced signal.

The operation of the equalization system 100 of FIG. 1 is described as follows.

In the receiver, the channel estimator 110 estimates a channel so as to reduce an ISI error and the prefilter 120 performs a prefiltering operation so as to perform an equalization operation. The DDFSE 130 receives, from the channel estimator 110 and the prefilter 120, parameters which are adjusted based on a channel characteristics.

However, in an equalization operation, the prefiltering operation performed by the prefilter 120 performs a number of computations. Therefore, a main processor needs to operate at a high clock frequency so as to perform a prefiltering operation and as a result, consumes a large amount of power.

In the EDGE standard, when the transmitter modulates a signal by use of the 8-PSK modulation scheme, the receiver typically demodulates the signal by use of a method of delayed decision feedback sequence estimation and is capable of performing sequence estimation after receiving a channel response without a precursor. The prefilter 120 changes the channel response to the sequence estimation and needs a large number of calculations for overall equalization system operation.

SUMMARY OF THE INVENTION

According to an embodiment of the present invention, a method of reducing a number of computations in an equalization process includes performing a pre-equalization operation on selected first frames from a plurality of frames, and estimating pre-equalization values of second frames based on the pre-equalization values of the selected first frames, the second frames being frames which are not selected from the plurality of frames. The method may further include selecting the first frames from the plurality of frames.

Estimating the pre-equalization values of the second frames may include performing an interpolation or extrapolation operation on the pre-equalization values of the second frames based on the pre-equalization values of the first frames, and performing a pre-equalization operation on the second frames when the pre-equalization values of the second frames do not satisfy predetermined criteria.

For example, the plurality of frames may correspond to four bursts in a packet transmission mode of the Enhanced Data rates for GSM Evolution (EDGE) standard, the first frames may correspond to two bursts among the four bursts, and the second frames may correspond to the other bursts among the four bursts. The predetermined criteria may correspond to one of a signal-to-noise ratio (SNR) and an energy-per-bit to noise density ratio (Eb/No).

According to an embodiment of the present invention, a method of reducing a number of computations in an equalization process includes performing a channel estimation operation on a plurality of frames, performing a prefiltering operation on selected first frames from the plurality of frames, and estimating prefiltering values of second frames based on the prefiltering values of the first frames, the second frames being frames which are not selected from the plurality of frames. The method may further include selecting the first frames from the plurality of frames.

Estimating the prefiltering values of the second frames may include performing an interpolation or extrapolation operation on the prefiltering values of the second frames based on the prefiltering values of the first frames when the channel estimation values of the plurality of frames satisfy predetermined criteria, and performing a prefiltering operation on the second frames when the channel estimation values of the plurality of frames do not satisfy predetermined criteria.

For example, the plurality of frames may correspond to four bursts in a packet transmission mode of the EDGE standard, the first frames may correspond to two bursts among the four bursts, and the second frames may correspond to the other bursts among the four bursts. The predetermined criteria may correspond to a deviation of the channel estimation values of the plurality of frames.

According to an embodiment of the present invention, an apparatus of reducing a number of computations includes means for performing a pre-equalization operation on selected first frames from a plurality of frames, and means for estimating pre-equalization values of second frames based on the pre equalization values of the selected first frames, the second frames being frames which are not selected from the plurality of frames. The apparatus may further include means for selecting the first frames from the plurality of frames.

The means for estimating the pre-equalization values of the second frames may include means for performing an interpolation or extrapolation operation on the pre-equalization values of the second frames based on the pre-equalization values of the first frames, and means for performing a pre-equalization operation on the second frames when the pre-equalization values of the second frames do not satisfy predetermined criteria.

For example, the plurality of frames may correspond to four bursts in a packet transmission mode of the EDGE standard, the first frames may correspond to two bursts among the four bursts, and the second frames may correspond to the other bursts among the four bursts. The predetermined criteria may correspond to one of an SNR and an energy-per-bit to noise density ratio (Eb/No).

According to an embodiment of the present invention, an apparatus of reducing a number of computations includes means for performing channel estimation operation on a plurality of frames, means for performing a prefiltering operation on selected first frames from alt the frames, and means for estimating prefiltering values of second frames based on the prefiltering values of the first frames, the second frames being frames which are not selected from the plurality of frames. The apparatus may further include means for selecting the first frames from the plurality of frames.

The means for estimating the prefiltering values of the second frames may include means for performing an interpolation or extrapolation operation on the prefiltering values of the second frames based on the prefiltering values of the first frames when the channel estimation values of the plurality of frames satisfy predetermined criteria and means for performing a prefiltering operation on the second frames when the channel estimation values of the plurality of frames do not satisfy predetermined criteria.

For example, the plurality of frames may correspond to four bursts in a packet transmission mode of the EDGE standard, the first frames may correspond to two bursts among the four bursts, and the second frames may correspond to the other bursts among the four bursts. The predetermined criteria may correspond to a deviation of the channel estimation values of the plurality of frames.

According to an embodiment of the present invention, an apparatus of reducing a number of computations includes a front-end processor configured to select first frames from a plurality of frames and estimate pre-equalization values of second frames based on pre-equalization values of selected first frames, the second frames being frames which are not selected from the plurality of frames, and a pre-equalizer configured to perform a pre-equalization operation on the selected first frames. The apparatus may further include a delayed decision feedback sequence estimator (DDFSE) configured to receive the pre-equalization values of the plurality of frames to perform an equalization operation on the plurality of frames.

The front-end processor may include a frame selector configured to select the first frames from the plurality of frames, and a pre-equalization estimator configured to estimate the pre-equalization values of the second frames based on the selected first frames.

The pre-equalizer may perform a pre-equalization operation on a third frame when one of the pre-equalization values of the second frames do not satisfy predetermined criteria, the third frame being one of the second frames.

The pre-equalization estimator may perform an interpolation or extrapolation on the pre-equalization values of the second frames.

For example, the plurality of frames may correspond to four bursts in a packet transmission mode of the EDGE standard, the first frames may correspond to two bursts among the four bursts, and the second frames may correspond to the other bursts among the four bursts. The predetermined criteria may correspond to one of an SNR and an energy-per-bit to noise density ratio (Eb/No).

According to an embodiment of the present invention, an apparatus of reducing a number of computations includes a front-end processor configured to select first frames from a plurality of frames and estimate prefiltering values of second frames based on channel estimation values of the plurality of frames and prefiltering values of selected first frames, the second frames being frames which are not selected from the plurality of frames, a channel estimator configured to perform a channel estimation operation on the plurality of frames, and a prefilter configured to perform a prefiltering operation on the first frames based on the channel estimation values of the plurality of frames.

The apparatus may further include a DDFSE configured to receive the channel estimation and prefiltering values of the plurality of frames to perform an equalization operation on the plurality of frames.

The front-end processor may include a frame selector configured to select the first frames from the plurality of frames, and a pre-equalization estimator configured to perform an interpolation or extrapolation operation on the prefiltering values of the second frames based on the prefiltering values of the first frames when the channel estimation values of the plurality of frames satisfy predetermined criteria, and configured to perform a prefiltering operation on thesecond frames when the channel estimation values of the plurality of frames do not satisfy predetermined criteria.

The pre-equalization estimator may perform an interpolation or extrapolation on the prefiltering values of the second frames.

For example, the plurality of frames may correspond to four bursts in a packet transmission mode of the EDGE standard, the first frames may correspond to two bursts among the four bursts, and the second frames may correspond to the other bursts among the four bursts. The predetermined criteria may correspond to a deviation of the channel estimation values of the plurality of frames.

BRIEF DESCRIPTION OF THE DRAWINGS

The present invention will become more apparent by describing in detail exemplary embodiments thereof with reference to the accompanying drawings, in which.

DETAILED DESCRIPTION OF PREFERRED EMBODIMENTS

Figure 1:
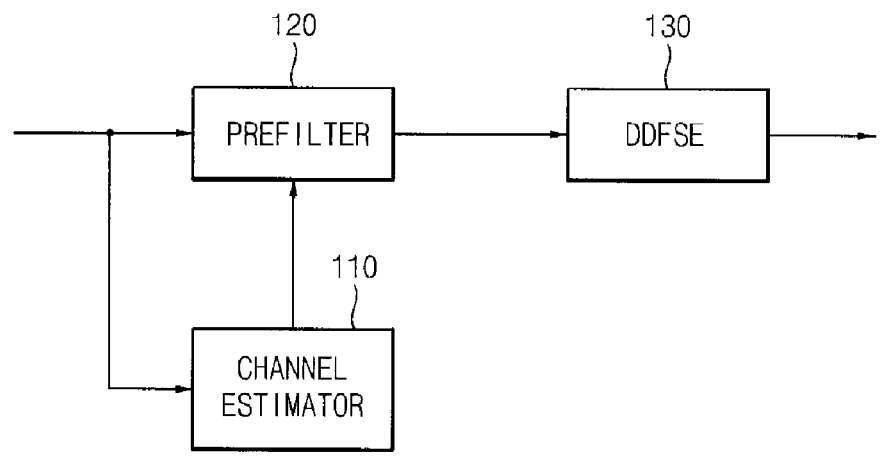
FIG. 1 is a block diagram illustrating an equalization system for reducing intersymbol interference (ISI).

Embodiments of the present invention now will be described more fully with reference to the accompanying drawings, in which embodiments of the invention are shown. The present invention may, however, be embodied in many different forms and should not be construed as limited to embodiments set forth herein. Rather, embodiments are provided so that this disclosure will be thorough and complete, and will fully convey the scope of the invention to those skilled in the art. Like reference numerals refer to like elements throughout this application.

Figure 2:
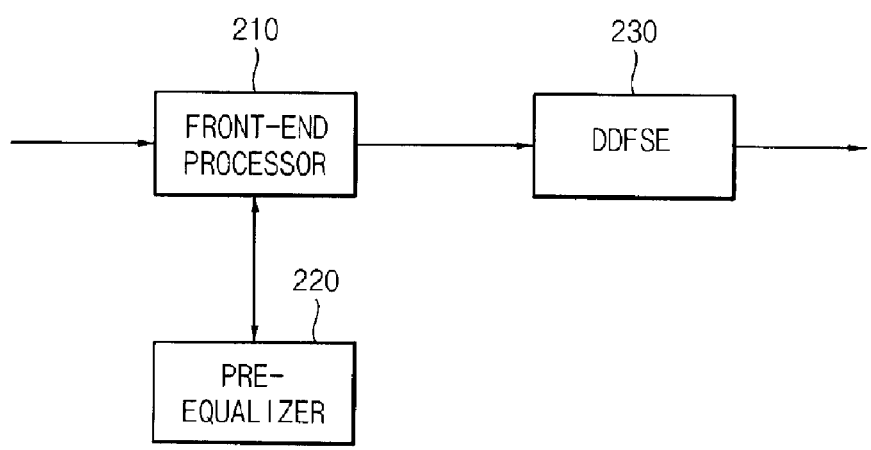
FIG. 2 is a block diagram illustrating an equalization system according to an exemplary embodiment of the present invention.

FIG. 2 is a block diagram illustrating an equalization system according to an exemplary embodiment of the present invention.

Referring to FIG. 2 the equalization system 200 includes a front-end processor 210, a pre-equalizer 220 and a delayed decision feedback sequence estimator (DDFSE) 230.

The front-end processor 210 selects first frames from all frames, outputs selected first frames to the pre-equalizer 220, and receives pre-equalized first frames from the pre-equalizer 220 to estimate pre-equalized second frames, which are not selected from the continuous frames, based on the pre-equalized first frames. When the pre-equalized second frames do not satisfy predetermined criteria, such as a predetermined signal-to-noise ratio (SNR) and/or a predetermined energy-per-bit to noise density ratio (Eb/No), the front-end processor 210 transmits original second frames to the pre-equalizer 220 and receives the pre-equalized second frames from the pre-equalizer 220. The operation of the front-end processor 210 will be described later.

The pre-equalizer 220 compensates for channel filtering to improve receiver performance. The pre-equalizer 220 receives the selected first frames from the front-end processor 210 performs a pre-equalization operation on the selected first frames and outputs the pre-equalized first frames to the front-end processor 210. The pre-equalizer 220 improves an SNR and substantially eliminates spectrum energy in an unwanted band.

The DDFSE 230 receives the pre-equalized first frames and the estimated and/or pre-equalized second frames from the front-end processor 210 and outputs an intersymbol interference (ISI)-reduced signal.

An exemplary embodiment of the operation of the equalization system 200 according to a packet transmission mode in the EDGE standard is described as follows.

In the packet transmission mode of the EDGE standard, the duration of the packet may be four bursts where a length of a single burst corresponds to 575 μS. Therefore, channel estimation values and prefiltering values among the four bursts are highly correlated.

The front-end processor 210 receives the four bursts to select the first and fourth bursts from the received four bursts and transmits the first and fourth bursts to the pre-equalizer 220. The pre-equalizer 220 performs a channel estimation operation and a prefiltering operation on the first and fourth bursts.

The front-end processor 210 receives channel estimation values and the prefiltering values, output by the pre-equalizer 220, for the first and fourth bursts and estimates channel estimation values and the prefiltering values for the second and third bursts based on the received channel estimation and prefiltering values of the first and fourth bursts.

If the channel estimation values and the prefiltering values for the second and third bursts do not satisfy predetermined criteria, such as an SNR, the front-end processor 210 transmits the second and third bursts to the pre-equalizer 220 and receives the pre-equalized second and third bursts from the pre-equalizer 220.

The DDFSE 230 performs an equalization operation on the four bursts based on the channel estimation and prefiltering values thereof.

Figure 3:
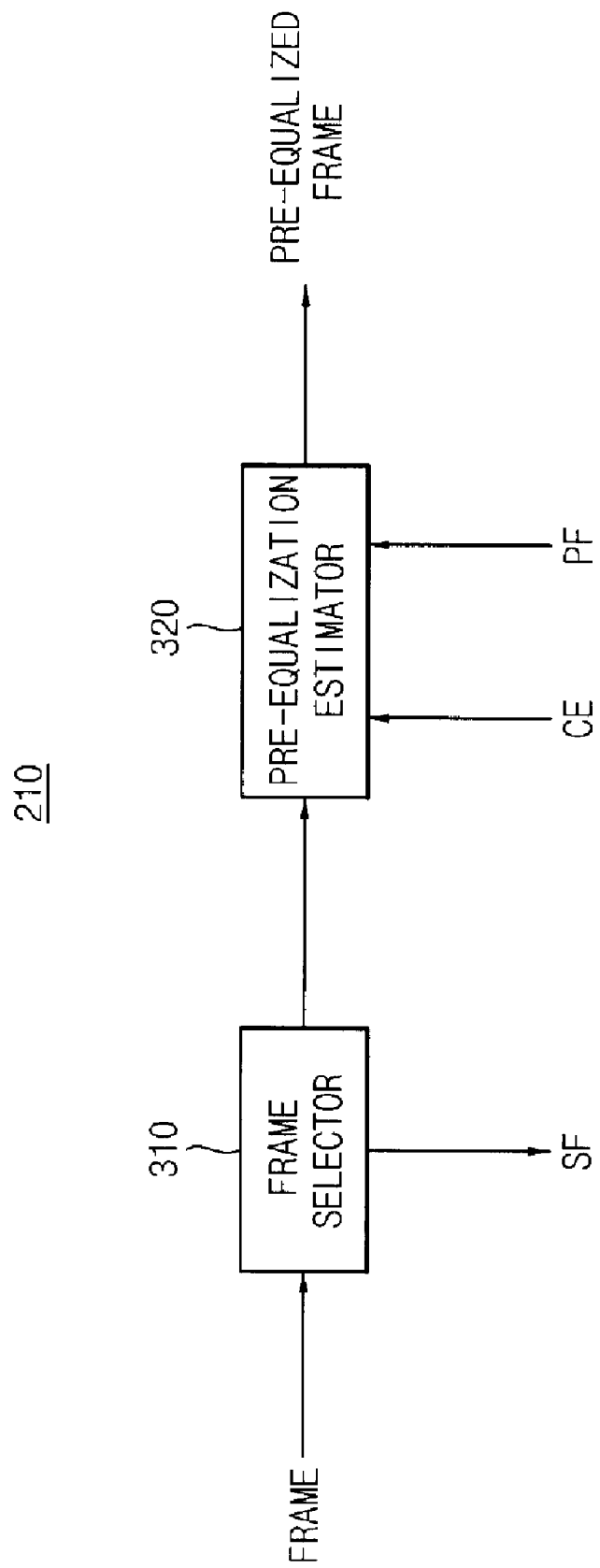
FIG. 3 is a block diagram illustrating the front-end processor in FIG. 2.

FIG. 3 is a block diagram illustrating the front-end processor in FIG. 2.

Referring to FIG. 3, the front-end processor 210 includes a frame selector 310 and a pre-equalization estimator 320.

The frame selector 310 selects one or more first frames from all frames and outputs the selected first frames to the pre-equalizer 220.

For example, in the packet transmission mode of the EDGE standard, the duration of the packet may be four bursts and the frame selector 310 may select one or more bursts from the four bursts.

The pre-equalization estimator 320 receives the pre-equalized first frames selected by the frame selector 310 and estimates pre-equalization values for second frames, which are not selected from all the frames. The pre-equalization estimator 320 verifies whether the second frames satisfy predetermined criteria, and if the second frames do not satisfy the predetermined criteria the pre-equalization estimator 320 transmits the verified result and the frame selector 310 re-transmits the second frames to the pre-equalizer 220. The pre-equalization estimator 320 receives the pre-equalized second frames and transmits alt the frames and the corresponding pre-equalized values to the DDFSE 230.

For example, in the packet transmission mode of the EDGE standard, the operation of the front-end processor 210 is described as follows.

The frame selector 310 receives four bursts and selects the first and fourth bursts from the four bursts. The frame selector 310 transmits the first and fourth bursts to the pre-equalizer 220 and may buffer the second and third bursts, which are not selected by the frame selector 310.

The pre-equalizer 220 performs a pre-equalization operation on the first and fourth bursts received from the frame selector 310 and transmits the pre-equalized first and fourth bursts to the pre-equalization estimator 320.

The pre-equalization estimator 320 receives pre-equalization values for the first and fourth bursts from the pre-equalizer 220 and estimates pre-equalization values for the second and third bursts. The pre-equalization estimator 320 verifies whether the pre-equalization values for the second and third bursts satisfy predetermined criteria.

If the pre-equalization values for the second burst do not satisfy the predetermined criteria the pre-equalization estimator 320 transmits the verified result to the frame selector 310. The frame selector 310 transmits the second burst to the pre-equalizer 220.

The pre-equalization estimator 320 transmits the four bursts and the corresponding pre-equalization values to the DDFSE 230.

The front-end processor 210 may be replaced with means for selecting one or more frames from all frames and means for estimating pre-equalization values for second frames, which are not selected from all frames based on pre-equalization values for first frames, which are selected from all the frames.

Figure 4:
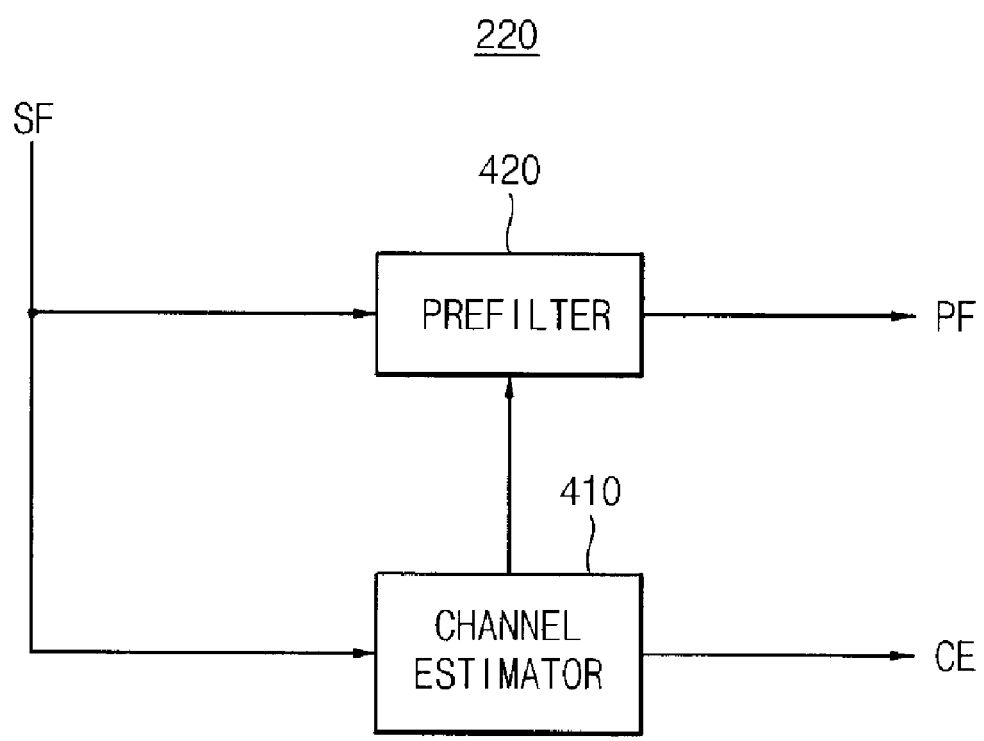
FIG. 4 is a block diagram illustrating the pre-equalizer in FIG. 2.

FIG. 4 is a block diagram illustrating the pre-equalizer 220 in FIG. 2.

Referring to FIG. 4: the pre-equalizer 220 includes a channel estimator 410 and a prefilter 420.

The channel estimator 410 receives the selected first frames from the frame selector 310 and performs channel estimation on the received first frames to output the channel estimation result to the prefilter 420 and the pre-equalization estimator 320.

For example, the channel estimator 410 may generate a channel impulse response and is needed for a system using coherent modulation and demodulation. Typically, the channel impulse response may be defined by a filter response of a transmitter, a channel response of a wireless channel and a filter response of a receiver.

The prefilter 420 receives the selected first frames and the channel estimation values thereof to perform a prefiltering operation on the selected first frames based on the channel estimation values thereof. The prefilter 420 outputs the prefiltering values to the pre-equalization estimator 320.

For example, the prefilter 420 may perform a channel matching so as to increase an SNR at a determination time of a certain symbol and receive, from the channel estimator 410, coefficients for a prefiltering operation. The prefilter 420 may transmit, to the DDFSE 230, complex symbol spaced samples.

Figure 5:
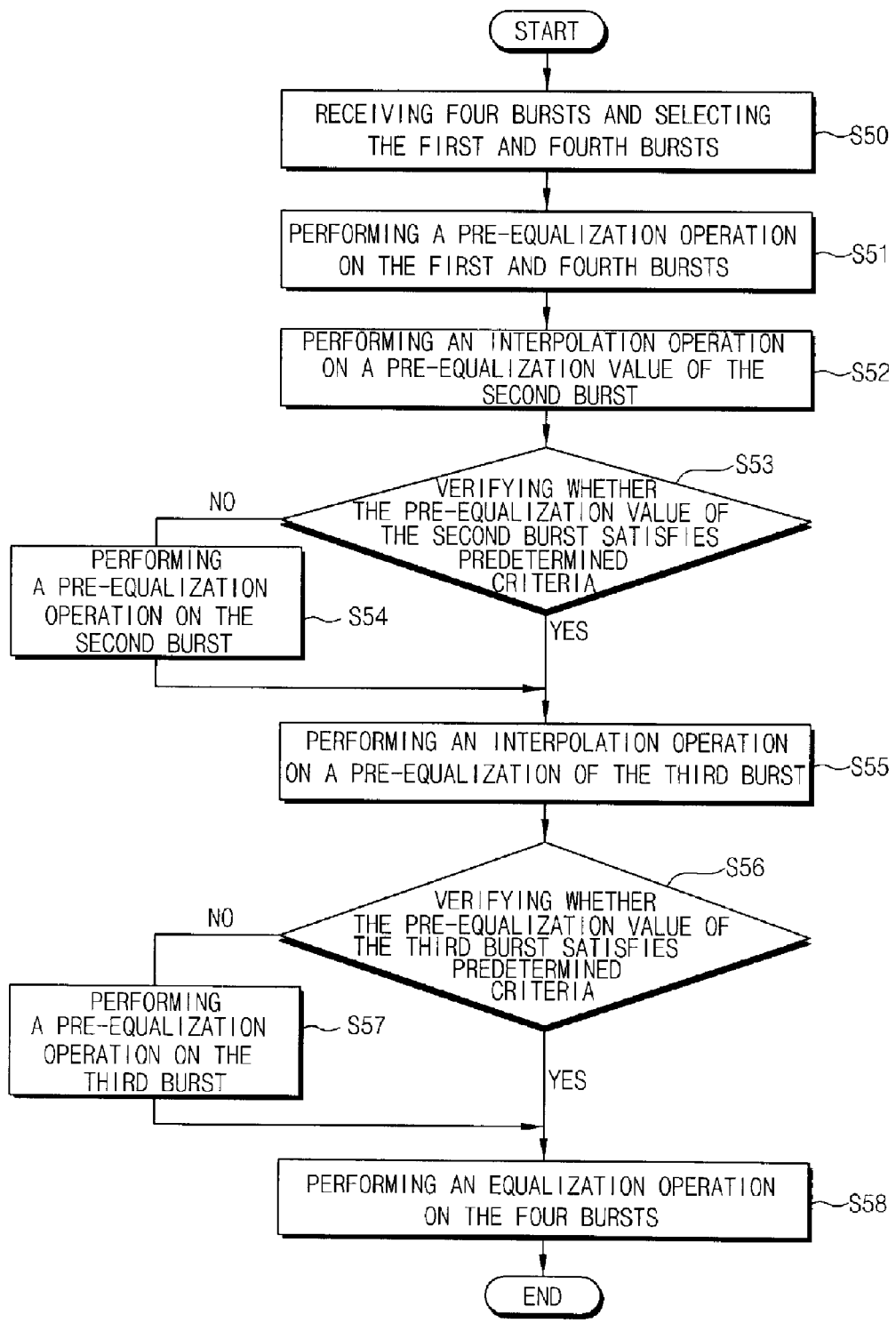
FIG. 5 is a flow chart illustrating the operation of the equalization system according to an exemplary embodiment of the present invention.

FIG. 5 is a flow chart illustrating the operation of the equalization system according to an exemplary embodiment of the present invention.

FIG. 5 assumes that the equalization system 200 operates in the packet transmission mode of the EDGE standard.

The frame selector 310 receives four bursts, selects the first and fourth bursts, and buffers the second and third frames, which are not selected by the frame selector 310 (Block S50). The frame selector 310 transmits the first and fourth bursts to the pre-equalizer 220.

The pre-equalizer 220 receives the first and fourth bursts to perform a pre-equalization operation on the received first and fourth bursts (Block S51). For example, the pre-equalization may include a channel estimation by the channel estimator 410 and a prefiltering by the prefilter 420.

The pre-equalization estimator 320 estimates a pre-equalization value of the second burst based on the pre-equalization values of the first and fourth bursts (Block S52).

For example, the pre-equalization estimator 320 may perform an interpolation operation on the pre-equalization value of the second burst based on the pre-equalization values of the first and fourth bursts. The interpolation method may include a linear interpolation method, a polynomial interpolation method or a spline interpolation method.

When the pre-equalization estimator 320 employs the linear interpolation method, the pre-equalization estimator 320 linearly draws the pre-equalization values of the first and fourth bursts and equally divides into three parts, the linearly drawn pre-equalization values of the first and fourth bursts. The pre-equalization estimator 320 draws four points in the linearly drawn pre-equalization values of the first and fourth bursts.

The pre-equalization estimator 320 estimates a second point a point neighboring the pre-equalization value of the first burst among the four points, as the pre-equalization value of the second burst.

The pre-equalization estimator 320 verifies whether the pre-equalization value of the second burst satisfies predetermined criteria (Block S53).

For example, the predetermined criteria may include an SNR or an energy-per-bit to noise density ratio (Eb/No).

When the pre-equalization value of the second burst does not satisfy the predetermined criteria, the pre-equalization estimator 320 transmits the verified value to the frame selector 310. The frame selector 310 transmits the second burst to the pre-equalizer 220. The pre-equalizer 220 performs a pre-equalization operation on the second burst and transmits the pre-equalization value of the second burst to the pre-equalization estimator 320 (Block S54).

The pre-equalization estimator 320 estimates a pre-equalization value of the third burst based on the pre-equalization values of the first and fourth bursts (Block S55).

For example, the pre-equalization estimator 320 may perform an interpolation operation on the third burst based on the pre-equalization values of the first and fourth bursts. The interpolation method may include a linear interpolation method, a polynomial interpolation method or a spline interpolation method.

When the pre-equalization estimator 320 employs the linear interpolation method, the pre-equalization estimator 320 linearly draws the pre-equalization values of the first and fourth bursts and equally divides, into three parts, the linearly drawn pre-equalization values of the first and fourth bursts. The pre-equalization estimator 320 draws four points in the linearly drawn pre-equalization values of the first and fourth bursts.

The pre-equalization estimator 320 estimates a third point, a point neighboring the pre-equalization value of the fourth burst among the four points, as the pre-equalization value of the third burst.

The pre-equalization estimator 320 verifies whether the pre-equalization value of the third burst satisfies predetermined criteria (Block S56).

For example, the predetermined criteria may include an SNR or an energy-per-bit to noise density ratio (Eb/No).

When the pre-equalization value of the third burst does not satisfy the predetermined criteria, the pre-equalization estimator 320 transmits the verified value to the frame selector 310. The frame selector 310 transmits the third burst to the pre-equalizer 220. The pre-equalizer 220 performs a pre-equalization operation on the third burst and transmits the pre-equalization value of the third burst to the pre-equalization estimator 320 (Block S57).

The pre-equalization estimator 320 transmits the pre-equalization of the four bursts to the DDFSE 230, and the DDFSE 230 performs an equalization operation on the four bursts (Block S58).

Figure 6:
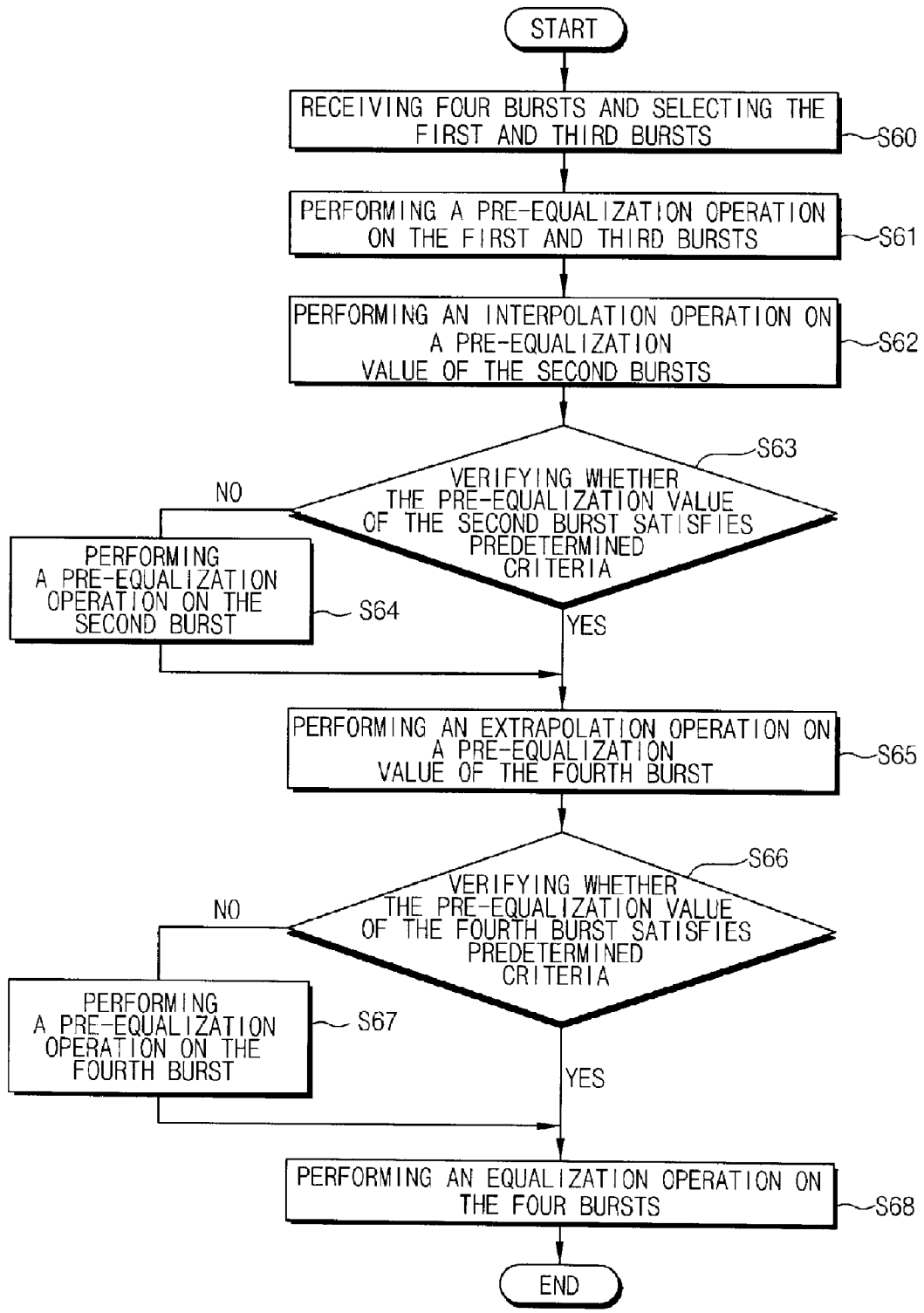
FIG. 6 is a flow chart illustrating the operation of the equalization system according to another exemplary embodiment of the present invention.

FIG. 6 is a flow chart illustrating the operation of the equalization system according to another exemplary embodiment of the present invention.

FIG. 6 assumes that the equalization system 200 operates in the packet transmission mode of the EDGE standard.

The frame selector 310 receives four bursts, selects the first and third bursts, and buffers the second and fourth frames, which are not selected by the frame selector 310 (Block S60). The frame selector 310 transmits the first and third bursts to the pre-equalizer 220.

The pre-equalizer 220 receives the first and third bursts to perform a pre-equalization operation on the received first and third bursts (Block S61). For example, the pre-equalization may include a channel estimation by the channel estimator 410 and a prefiltering by the prefilter 420. The pre-equalizer 200 outputs the results of pre-equalization of the first and third bursts to the pre-equalization estimator 320.

The pre-equalization estimator 320 estimates a pre-equalization value of the second burst based on the pre-equalization value of the first and third bursts (Block S62).

For example, the pre-equalization estimator 320 may perform an interpolation operation on the second burst based on the pre-equalization value of the first and third bursts. The interpolation method may include a linear interpolation method, a polynomial interpolation method or a spline interpolation method.

When the pre-equalization estimator 320 employs the linear interpolation method, the pre-equalization estimator 320 linearly draws the pre-equalization values of the first and third bursts and equally divides into two parts, the linearly drawn pre-equalization values of the first and third bursts. The pre-equalization estimator 320 draws three points in the linearly drawn pre-equalization values of the first and third bursts.

The pre-equalization estimator 320 estimates a second point, which is about a midpoint of the pre-equalization value between the first and third bursts, as the pre-equalization value of the second burst.

The pre-equalization estimator 320 verifies whether the pre-equalization value of the second burst satisfies predetermined criteria (Block S63).

For example, the predetermined criteria may include an SNR or an energy-per-bit to noise density ratio (Eb/No).

When the pre-equalization value of the second burst does not satisfy the predetermined criteria, the pre-equalization estimator 320 transmits the verified value to the frame selector 310. The frame selector 310 transmits the second burst to the pre-equalizer 220. The pre-equalizer 220 performs a pre-equalization operation on the second burst and transmits the pre-equalization value of the second burst to the pre-equalization estimator 320 (Block S64).

The pre-equalization estimator 320 estimates a pre-equalization value of the fourth burst based on the pre-equalization value of the first and third bursts (Block S65).

For example, the pre-equalization estimator 320 may perform an extrapolation operation on the pre-equalization value of the fourth burst based on the pre-equalization values of the first and third bursts. The extrapolation method may include a linear extrapolation method, a polynomial extrapolation method or a spline extrapolation method.

When the pre-equalization estimator 320 employs the linear extrapolation method, the pre-equalization estimator 320 linearly draws the pre-equalization values of the first and third bursts and extends, by 1.5 times, the linearly drawn pre-equalization values of the first and third bursts in a direction to the pre-equalization values of the third burst.

The pre-equalization estimator 320 estimates an extended point, a newly extended point neighboring the pre-equalization value of the third burst, as the pre-equalization value of the fourth burst.

The pre-equalization estimator 320 verifies whether the pre-equalization value of the fourth burst satisfies predetermined criteria (Block S66).

For example, the predetermined criteria may include an SNR or an energy-per-bit to noise density ratio (Eb/No).

When the pre-equalization value of the third burst does not satisfy the predetermined criteria, the pre-equalization estimator 320 transmits the verified value to the frame selector 310. The frame selector 310 transmits the fourth burst to the pre-equalizer 220. The pre-equalizer 220 performs a pre-equalization operation on the fourth burst and transmits the pre-equalization value of the fourth burst to the pre-equalization estimator 320 (Block S67).

The pre-equalization estimator 320 transmits the pre-equalization of the four bursts to the DDFSE 230, and the DDFSE 230 performs an equalization operation on the four bursts (Block S68).

Figure 7:
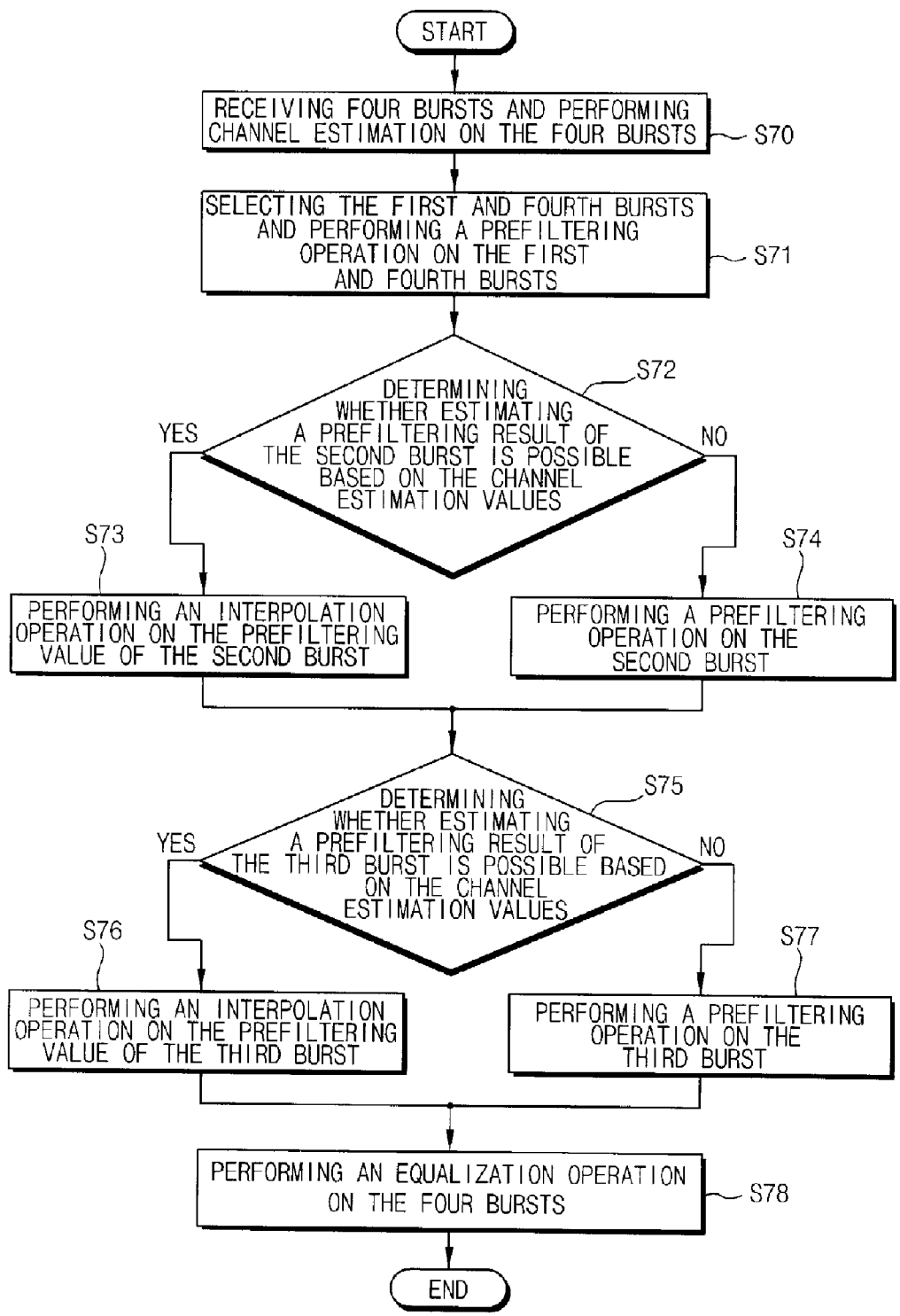
FIG. 7 is a flow chart illustrating the operation of the equalization system according to still another exemplary embodiment of the present invention.

FIG. 7 is a flow chart illustrating the operation of the equalization system according to still another exemplary embodiment of the present invention.

FIG. 7 assumes that the equalization system 200 operates in the packet transmission mode of the EDGE standard.

The frame selector 310 receives four bursts and transmits the four bursts to the channel estimator 410. The channel estimator 410 performs channel estimation on the four bursts (Block S70).

The frame selector 310 selects the first and fourth bursts and buffers the second and third bursts, which are not selected by the frame selector 310. The frame selector 310 transmits the first and fourth bursts to the prefilter 420. The prefilter 420 performs a prefiltering operation on the first and fourth bursts (Block S71).

The pre-equalization estimator 320 receives channel estimation values of the four bursts and prefiltering values of the first and fourth bursts, and determines whether the pre-equalization estimator 320 estimates a prefiltering value of the second burst based on the channel estimation values of the four bursts (Block S72). The criteria may be a deviation among the channel estimation values.

For example, when a Doppler effect is small—that is, when a receiver moves slowly—the deviation of the channel estimation values may be small. Therefore, the pre-equalization estimator 320 may estimate the prefiltering value of the second burst.

If the deviation of the channel estimation values satisfies certain criteria, the pre-equalization estimator 320 estimates the prefiltering values of the second burst based on the prefiltering values of the first and fourth bursts (Block S73).

For example, the pre-equalization estimator 320 may perform an interpolation operation on the prefiltering value of the second burst based on the prefiltering values of the first and fourth bursts. The interpolation method may include a linear interpolation method, a polynomial interpolation method or a spline interpolation method.

When the pre-equalization estimator 320 employs the linear interpolation method, the pre-equalization estimator 320 linearly draws the prefiltering values of the first and fourth bursts and equally divides, into three parts, the linearly drawn prefiltering values of the first and fourth bursts. The pre-equalization estimator 320 draws four points in the linearly drawn prefiltering values of the first and fourth bursts.

The pre-equalization estimator 320 estimates a second point, a point neighboring the prefiltering value of the first burst among the four points, as the prefiltering value of the second burst.

If the deviation of the channel estimation values does not satisfy the certain criteria, the pre-equalization estimator 320 transmits the determination result to the frame selector 310. The frame selector 320 transmits the second burst to the prefilter 420. The prefilter 420 performs a prefiltering operation on the second burst and transmits the prefiltering value of the second burst to the pre-equalization estimator 320 (Block S74).

The pre-equalization estimator 320 determines whether the pre-equalization estimator 320 estimates a prefiltering value of the third burst based on the channel estimation values of the four bursts (Block S75). The criteria may be a deviation among the channel estimation values.

For example, when a Doppler effect is small—that is, when a receiver moves slowly—the deviation of the channel estimation values may be small. Therefore, the pre-equalization estimator 320 may estimate the prefiltering value of the third burst.

If the deviation of the channel estimation values satisfies certain criteria, the pre-equalization estimator 320 estimates the prefiltering values of the third burst based on the prefiltering values of the first and fourth bursts (Block S76).

For example, the pre-equalization estimator 320 may perform an interpolation operation on the prefiltering value of the third burst based on the prefiltering values of the first and fourth bursts. The interpolation method may include a linear interpolation method, a polynomial interpolation method or a spline interpolation method.

When the pre-equalization estimator 320 employs the linear interpolation method, the pre-equalization estimator 320 linearly draws the prefiltering values of the first and fourth bursts and equally divides, into three parts, the linearly drawn prefiltering values of the first and fourth bursts. The pre-equalization estimator 320 draws four points in the linearly drawn prefiltering values of the first and fourth bursts.

The pre-equalization estimator 320 estimates a third point, a point neighboring the prefiltering value of the fourth burst among the four points, as the prefiltering value of the third burst.

If the deviation of the channel estimation values does not satisfy the certain criteria the pre-equalization estimator 320 transmits the determination result to the frame selector 310. The frame selector 320 transmits the third burst to the prefilter 420. The prefilter 420 performs a prefiltering operation on the third burst and transmits the prefiltering value of the third burst to the pre-equalization estimator 320 (Block S77).

The pre-equalization estimator 320 transmits the prefiltering values of the four bursts to the DDFSE 230, and the DDFSE 230 performs an equalization operation on the four bursts (Block S78).

Figure 8:
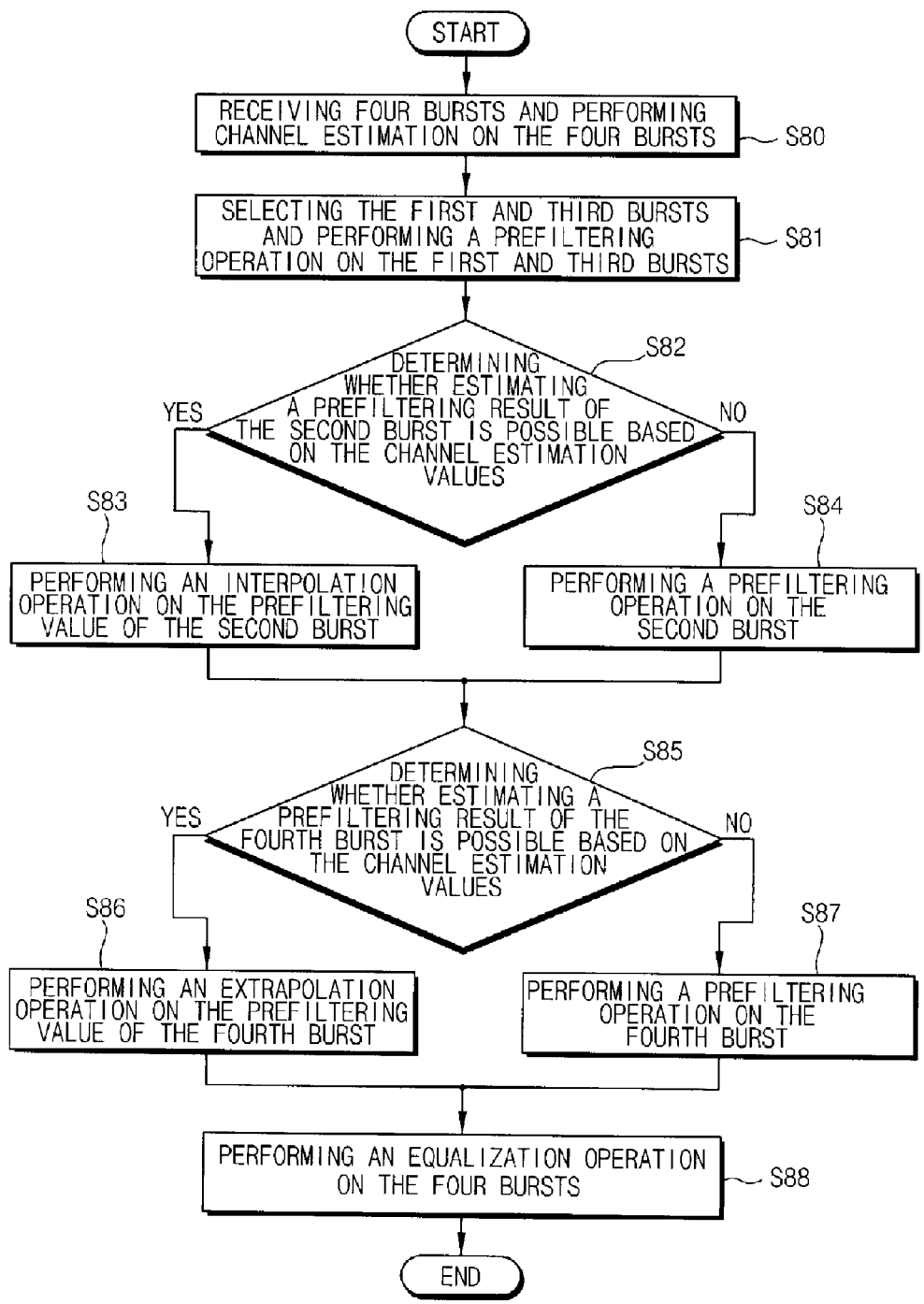
FIG. 8 is a flow chart illustrating the operation of the equalization system according to still another exemplary embodiment of the present invention.

FIG. 8 is a flow chart illustrating the operation of the equalization system according to still another exemplary embodiment of the present invention.

FIG. 8 assumes that the equalization system 200 operates in the packet transmission mode of the EDGE standard.

The frame selector 310 receives four bursts and transmits the four bursts to the channel estimator 410. The channel estimator 410 performs channel estimation on the four bursts (Block S80).

The frame selector 310 selects the first and third bursts and buffers the second and fourth bursts, which are not selected by the frame selector 310. The frame selector transmits the first and third bursts to the prefilter 420. The prefilter 420 performs a prefiltering operation on the first and third bursts (Block S81).

The pre-equalization estimator 320 receives channel estimation values of the four bursts and prefiltering values of the first and third bursts, and determines whether the pre-equalization estimator 320 estimates a prefiltering value of the fourth burst based on the channel estimation values of the four bursts (Block S82). The criteria may be a deviation among the channel estimation values.

For example, when a Doppler effect is small—that is, when a receiver moves slowly—the deviation of the channel estimation values may be small. Therefore, the pre-equalization estimator 320 may estimate the prefiltering value of the fourth burst.

If the deviation of the channel estimation values satisfies certain criteria, the pre-equalization estimator 320 estimates the prefiltering values of the second burst based on the prefiltering values of the first and fourth bursts (Block S83).

For example, the pre-equalization estimator 320 may perform an interpolation operation on the prefiltering value of the second burst based on the prefiltering values of the first and fourth bursts. The interpolation method may include a linear interpolation method, a polynomial interpolation method or a spline interpolation method.

When the pre-equalization estimator 320 employs the linear interpolation method, the pre-equalization estimator 320 linearly draws the prefiltering values of the first and fourth bursts and equally divides, into three parts, the linearly drawn prefiltering values of the first and fourth bursts. The pre-equalization estimator 320 draws four points in the linearly drawn prefiltering values of the first and fourth bursts.

The pre-equalization estimator 320 estimates a second point, a point neighboring the prefiltering value of the first burst among the four points, as the prefiltering value of the second burst.

If the deviation of the channel estimation values does not satisfy the certain criteria, the pre-equalization estimator 320 transmits the determination result to the frame selector 310. The frame selector 320 transmits the second burst to the prefilter 420. The prefilter 420 performs a prefiltering operation on the second burst and transmits the prefiltering value of the second burst to the pre-equalization estimator 320 (Block S84).

The pre-equalization estimator 320 determines whether the pre-equalization estimator 320 estimates a prefiltering value of the fourth burst based on the channel estimation values of the four bursts (Block S85). The criteria may be a deviation among the channel estimation values.

For example, when a Doppler effect is small—that is, when a receiver moves slowly—the deviation of the channel estimation values may be small. Therefore, the pre-equalization estimator 320 may estimate the prefiltering value of the fourth burst.

If the deviation of the channel estimation values satisfies certain criteria the pre-equalization estimator 320 estimates the prefiltering values of the fourth burst based on the prefiltering values of the first and third bursts (Block S86).

For example, the pre-equalization estimator 320 may perform an extrapolation operation on the prefiltering value of the fourth burst based on the prefiltering values of the first and third bursts. The extrapolation method may include a linear extrapolation method, a polynomial extrapolation method or a spline extrapolation method.

When the pre-equalization estimator 320 employs the linear extrapolation method, the pre-equalization estimator 320 linearly draws the prefiltering values of the first and third bursts and extends, by 1.5 times, the linearly drawn prefiltering values of the first and third bursts in a direction to the prefiltering values of the third burst.

The pre-equalization estimator 320 estimates an extended point, a newly extended point neighboring the prefiltering value of the third burst, as the prefiltering value of the fourth burst.

If the deviation of the channel estimation values does not satisfy the certain criteria, the pre-equalization estimator 320 transmits the determination result to the frame selector 310. The frame selector 320 transmits the fourth burst to the prefilter 420. The prefilter 420 performs a prefiltering operation on the fourth burst and transmits the prefiltering value of the fourth burst to the pre-equalization estimator 320 (Block S87).

The pre-equalization estimator 320 transmits the prefiltering values of the four bursts to the DDFSE 230, and the DDFSE 230 performs an equalization operation on the four bursts (Block 588).

As described above, the equalization system according to exemplary embodiments of the present invention may reduce power consumption by reducing a number of computations in an equalization process.

Exemplary embodiments of the present invention being thus described, it will be obvious that the same may be varied in many ways. For example, the equalization system in FIGS. 2 through 4 includes the front-end processor and the pre-equalizer. However, the front-end processor may be replaced with means for estimating pre-equalization values of the selected first frames based on those of the second frames, which are not selected and the pre-equalizer may be replaced with means for performing a pre-equalization so as to reduce a number of computations. Additionally, the equalization system in FIGS. 5 through 8 may be mixed at an estimation time of a certain pre-equalization value of a certain burst.

The channel estimator the prefilter and the DDFSE may be implemented in separate integrated circuits (ICs) and may be also implemented in a single digital signal processor (DSP) or a single application specific integrated circuit (ASIC).

Such variations are not to be regarded as a departure from the spirit and scope of exemplary embodiments of the present invention, and all such modifications as would be obvious to one skilled in the art are intended to be included within the scope of the disclosure.

What is claimed is:

1. A method of reducing a number of computations in an equalization process, comprising:
   performing a pre-equalization operation on selected first frames from a plurality of frames;
   estimating pre-equalization values of second frames based on the pre-equalization values of the selected first frames, the second frames being frames which are not selected from the plurality of frames; and
   selecting the first frames from the plurality of frames,
   wherein estimating the pre-equalization values of the second frames comprises:
   performing one of an interpolation and an extrapolation operation on the pre-equalization values of the second frames based on the pre-equalization values of the first frames; and
   performing a pre-equalization operation on the second frames when the pre-equalization values of the second frames do not satisfy predetermined criteria.

2. The method of claim 1, wherein the plurality of frames correspond to four bursts in a packet transmission mode of the Enhanced Data rates for GSM Evolution (EDGE) standard, the first frames corresponding to two bursts among the four bursts, and the second frames corresponding to the other bursts among the four bursts.

3. The method of claim 1, wherein the predetermined criteria correspond to one of a signal-to-noise ratio (SNR) and an energy-per-bit to noise density ratio (Eb/No).

4. A method of reducing a number of computations in an equalization process, comprising:
   performing channel estimation operation on a plurality of frames;
   performing a prefiltering operation on selected first frames from the plurality of frames;
   estimating prefiltering values of second frames based on the prefiltering values of the first frames, the second frames being frames which are not selected from the plurality of frames; and
   selecting the first frames from the plurality of frames,
   wherein estimating the prefiltering values of the second frames comprises:
   performing one of an interpolation and an extrapolation operation on the prefiltering values of the second frames based on the prefiltering values of the first frames when the channel estimation values of the plurality of frames satisfy predetermined criteria; and
   performing a prefiltering operation on the second frames when the channel estimation values of the plurality of frames do not satisfy predetermined criteria.

5. The method of claim 4, wherein the plurality of frames correspond to four bursts in a packet transmission mode of the EDGE standard, the first frames corresponding to two bursts among the four bursts, and the second frames corresponding to the other bursts among the four bursts.

6. The method of claim 4, wherein the predetermined criteria correspond to a deviation of the channel estimation values of the plurality of frames.

7. An apparatus of reducing a number of computations, comprising:
   means for performing a pre-equalization operation on selected first frames from a plurality of frames;
   means for estimating pre-equalization values of second frames based on the pre-equalization values of the selected first frames, the second frames being frames which are not selected from the plurality of frames; and
   means for selecting the first frames from the plurality of frames,
   wherein the means for estimating the pre-equalization values of the second frames comprises:
   means for performing one of an interpolation and an extrapolation operation on the pre-equalization values of the second frames based on the pre-equalization values of the first frames; and
   means for performing a pre-equalization operation on the second frames when the pre-equalization values of the second frames do not satisfy predetermined criteria.

8. The apparatus of claim 7, wherein the plurality of frames correspond to four bursts in a packet transmission mode of the EDGE standard, the first frames corresponding to two bursts among the four bursts, and the second frames corresponding to the other bursts among the four bursts.

9. The apparatus of claim 7, wherein the predetermined criteria correspond to one of an SNR and an energy-per-bit to noise density ratio (Eb/No).

10. An apparatus of reducing a number of computations, comprising:
    means for performing channel estimation operation on a plurality of frames;

means for performing a prefiltering operation on selected first frames from the plurality of frames;

means for estimating prefiltering values of second frames based on the prefiltering values of the first frames, the second frames being frames which are not selected from the plurality of frames; and means for selecting the first frames from the plurality of frames;

wherein the means for estimating the prefiltering values of the second frames comprises:

means for performing one of an interpolation and an extrapolation operation on the prefiltering values of the second frames based on the prefiltering values of the first frames when the channel estimation values of the plurality of frames satisfy predetermined criteria; and means for performing a prefiltering operation on the second frames when the channel estimation values of the plurality of frames do not satisfy predetermined criteria.

11. The apparatus of claim 10, wherein all the frames correspond to four bursts in a packet transmission mode of the EDGE standard, the first frames corresponding to two bursts among the four bursts, and the second frames corresponding to the other bursts among the four bursts.

12. The apparatus of claim 10, wherein the predetermined criteria correspond to a deviation of the channel estimation values of all the frames.

13. An apparatus for reducing a number of computations, comprising:

a front-end processor configured to select first frames from a plurality of frames and estimate pre-equalization values of second frames based on pre-equalization values of selected first frames, the second frames being frames which are not selected from the plurality of frames; and a pre-equalizer configured to perform a pre-equalization operation on the selected first frames, wherein the front-end processor comprises:

a frame selector configured to select the first frames from the plurality of frames; and a pre-equalization estimator configured to estimate the pre-equalization values of the second frames based on the selected first frames, and wherein the pre-equalizer performs a pre-equalization operation on a third frame when one of the pre-equalization values of the second frames do not satisfy predetermined criteria, the third frame being one of the second frames.

14. The apparatus of claim 13, further comprising:

a delayed decision feedback sequence estimator (DDFSE) configured to receive the pre-equalization values of the plurality of frames to perform an equalization operation on the plurality of frames.

15. The apparatus of claim 13, wherein the pre-equalization estimator performs one of an interpolation and an extrapolation on the pre-equalization values of the second frames.

16. The apparatus of claim 15, wherein all the frames correspond to four bursts in a packet transmission mode of the EDGE standard, the first frames corresponding to two bursts among the four bursts, and the second frames corresponding to the other bursts among the four bursts.

17. The apparatus of claim 16, wherein the predetermined criteria correspond to one of an SNR and an energy-per-bit to noise density ratio (Eb/No).

18. An apparatus for reducing a number of computations, comprising:

a front-end processor configured to select first frames from a plurality of frames and estimate prefiltering values of second frames based on channel estimation values of the plurality of frames and prefiltering values of selected first frames, the second frames being frames which are not selected from the plurality of frames;

a channel estimator configured to perform a channel estimation operation on the plurality of frames; and a prefilter configured to perform a prefiltering operation on the first frames based on the channel estimation values of the plurality of frames, wherein the front-end processor comprises:

a frame selector configured to select the first frames from the plurality of frames; and a pre-equalization estimator configured to perform one of an interpolation and an extrapolation operation on the prefiltering values of the second frames based on the prefiltering values of the first frames, when the channel estimation values of the plurality of frames satisfy predetermined criteria, and configured to perform a prefiltering operation on the second frames when the channel estimation values of the plurality of frames do not satisfy predetermined criteria.

19. The apparatus of claim 18, further comprising:

a DDFSE configured to receive the channel estimation and prefiltering values of the plurality of frames to perform an equalization operation on the plurality of frames.

20. The apparatus of claim 18, wherein the pre-equalization estimator performs one of an interpolation and an extrapolation on the prefiltering values of the second frames.

21. The apparatus of claim 20, wherein all the frames correspond to four bursts in a packet transmission mode of the EDGE standard, the first frames corresponding to two bursts among the four bursts, and the second frames corresponding to the other bursts among the four bursts.

22. The apparatus of claim 21, wherein the predetermined criteria correspond to a deviation of the channel estimation values of the plurality of frames.

* * * * *